Feb. 23, 1943. W. G. SCHNEIDER ET AL 2,312,003
MACHINE FOR MAKING THE PRESS MEMBERS OR
BASE PORTIONS OF ELECTRONIC TUBES
Filed June 8, 1940 14 Sheets-Sheet 1

INVENTORS
Gerhard Gunther Schneider
BY Walter Gustave Schneider
Mock & Blum
ATTORNEYS.

Feb. 23, 1943.                W. G. SCHNEIDER ET AL                2,312,003
              MACHINE FOR MAKING THE PRESS MEMBERS OR
                   BASE PORTIONS OF ELECTRONIC TUBES
                      Filed June 8, 1940            14 Sheets-Sheet 2

INVENTORS
Gerhard Gunther Schneider
BY  Walter Gustave Schneider
     Mock & Blum
        ATTORNEYS.

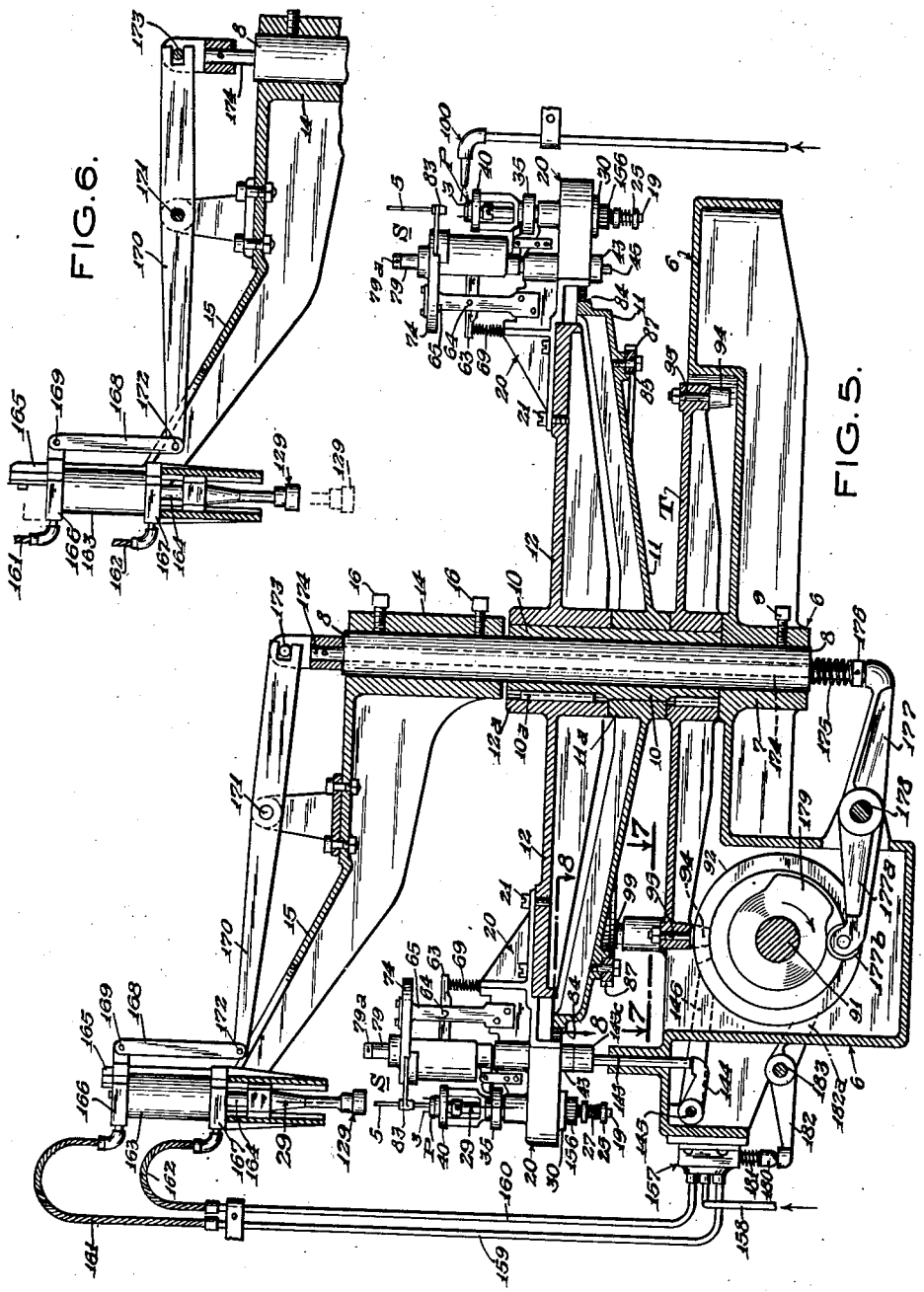

INVENTORS
Gerhard Gunther Schneider
BY Walter Gustave Schneider
Mock + Blum
ATTORNEYS Feb. 23, 1943.                     W. G. SCHNEIDER ET AL                      2,312,003
                    MACHINE FOR MAKING THE PRESS MEMBERS OR
                       BASE PORTIONS OF ELECTRONIC TUBES
                              Filed June 8, 1940                    14 Sheets-Sheet 6

INVENTORS
Gerhard Gunther Schneider
BY Walter Gustave Schneider
Mock r Blum
ATTORNEYS Feb. 23, 1943.  W. G. SCHNEIDER ET AL  2,312,003
MACHINE FOR MAKING THE PRESS MEMBERS OR
BASE PORTIONS OF ELECTRONIC TUBES
Filed June 8, 1940  14 Sheets-Sheet 7

INVENTORS
Gerhard Gunther Schneider
BY Walter Gustave Schneider
Mock & Blum
ATTORNEYS Feb. 23, 1943.   W. G. SCHNEIDER ET AL   2,312,003
MACHINE FOR MAKING THE PRESS MEMBERS OR
BASE PORTIONS OF ELECTRONIC TUBES
Filed June 8, 1940   14 Sheets-Sheet 8
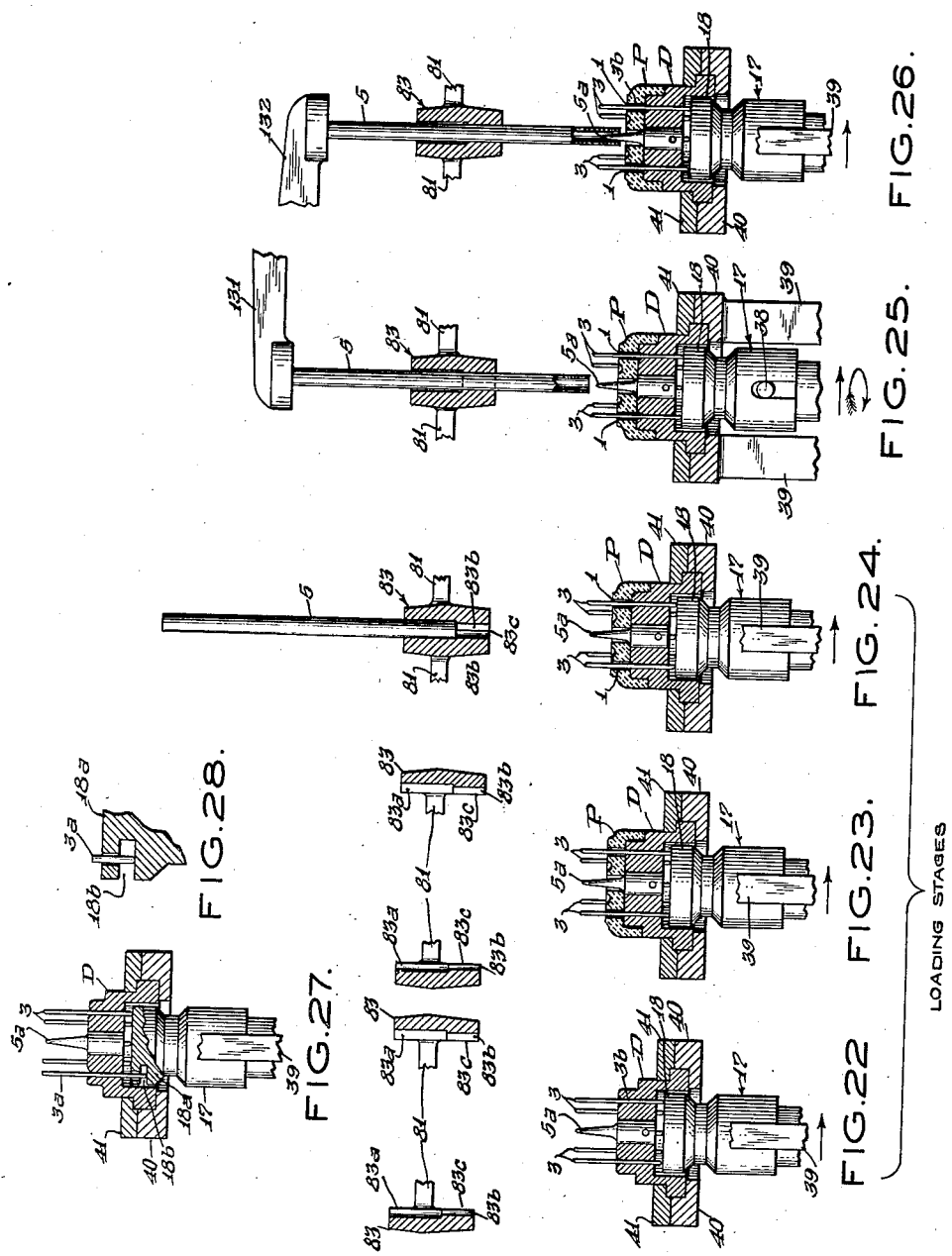
INVENTORS
Gerhard Gunther Schneider
BY Walter Gustave Schneider
Max Blum
ATTORNEYS

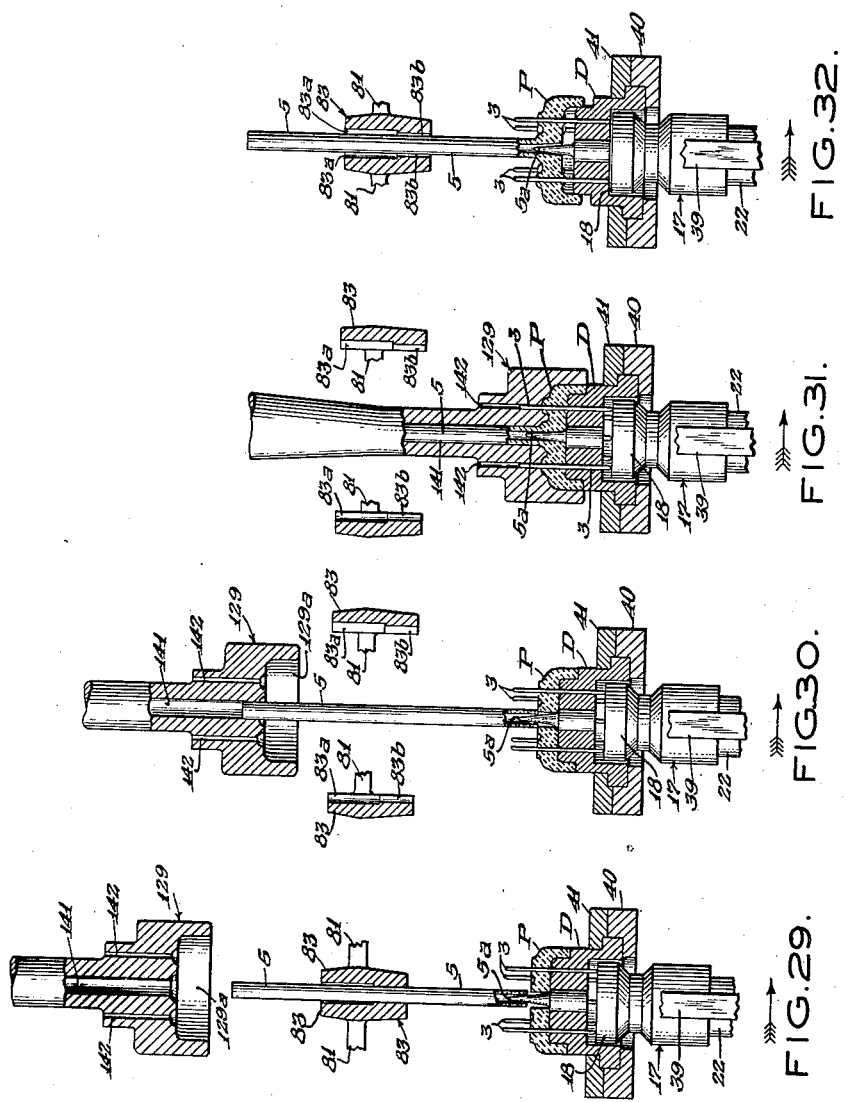

Feb. 23, 1943. W. G. SCHNEIDER ET AL 2,312,003
MACHINE FOR MAKING THE PRESS MEMBERS OR
BASE PORTIONS OF ELECTRONIC TUBES
Filed June 8, 1940 14 Sheets-Sheet 10

INVENTORS
Gerhard Gunther Schneider
BY Walter Gustave Schneider
Moses Blum
ATTORNEYS INVENTORS
Gerhard Gunther Schneider
BY Walter Gustave Schneider
Mock+Blum
ATTORNEYS

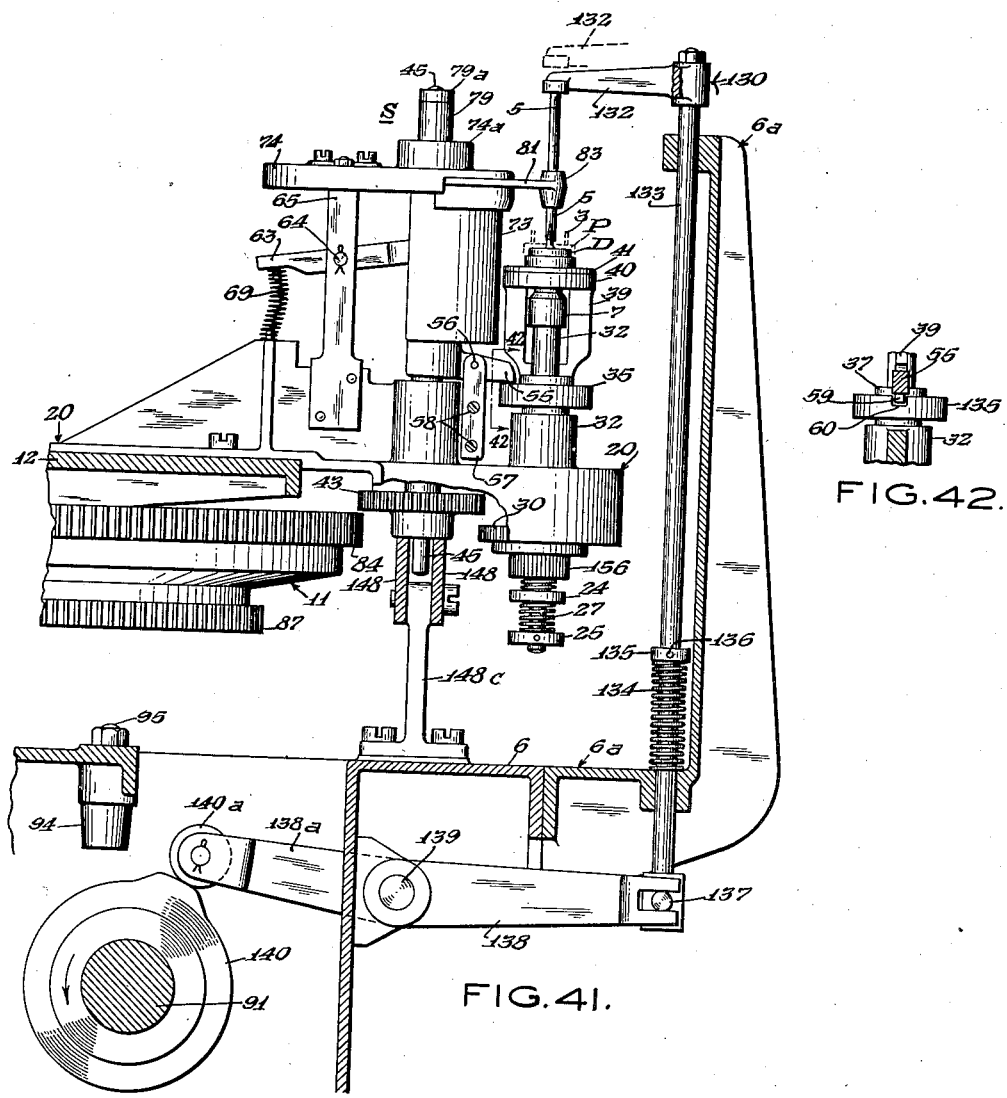

Feb. 23, 1943.    W. G. SCHNEIDER ET AL    2,312,003
MACHINE FOR MAKING THE PRESS MEMBERS OR
BASE PORTIONS OF ELECTRONIC TUBES
Filed June 8, 1940    14 Sheets-Sheet 14
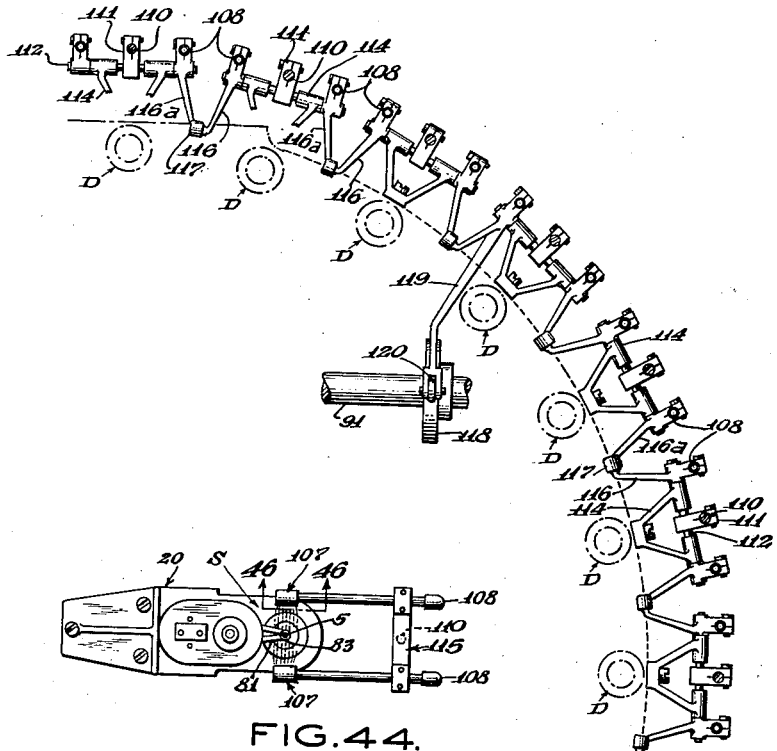
FIG.44.
FIG.43.
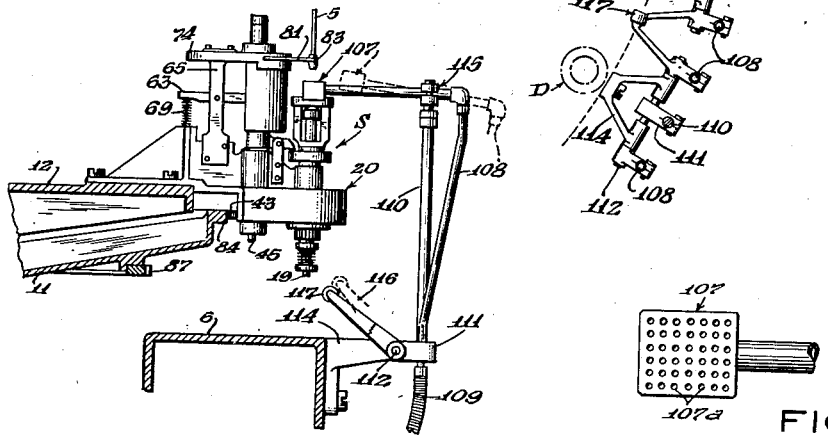
FIG.45.
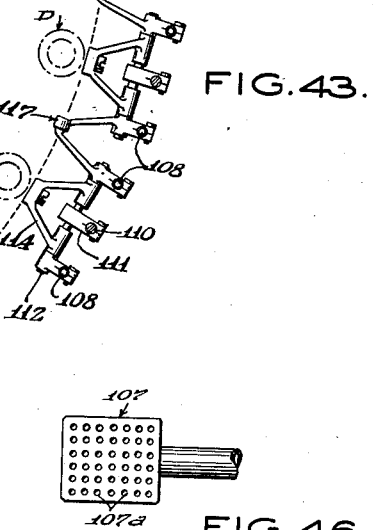
FIG.46.
INVENTORS
Gerhard Gunther Schneider
Walter Gustave Schneider
BY Mock & Blum
ATTORNEYS Patented Feb. 23, 1943

2,312,003

UNITED STATES PATENT OFFICE 2,312,003

MACHINE FOR MAKING THE PRESS MEMBERS OR BASE PORTIONS OF ELECTRONIC TUBES

Walter Gustave Schneider and Gerhard Gunther Schneider, East Orange, N. J., assignors to National Union Radio Corporation, Newark, N. J., a corporation of New Jersey Application June 8, 1940, Serial No. 339,584

13 Claims. (Cl. 49—2)

This invention relates to a new and improved machine for making the press members or base portions of electronic tubes, and more particularly the electronic tubes which are used in radio receiving sets.

One of the objects of the invention is to produce a reliable high speed machine, which will greatly facilitate the work of the operators of said machine.

Another object of the invention is to provide a machine which has a plurality of spindle units and of die mechanisms which are respectively associated with said spindle units, said spindle units and die mechanism and the operating mechanism for operating the same being located on associated movable members which are operated intermittently in unison. These intermittently operated members may be turntables or the like.

Another object of the invention is to provide a machine with a continuously operated member, such as a continuously operated turntable, which will rotate the spindles of said spindle units.

Another object of the invention is to provide a machine which is substantially free from heavy overhead parts which must be vertically actuated and which will provide convenient access to the spindle units and to the die mechanisms.

Another object of the invention is to provide improved means for assembling the press blanks with their terminals and with their central tubes.

Another object of the invention is to provide improved mechanism for heating and for annealing the press blanks.

Another object of the invention is to provide improved mechanism for rotating the press blanks during certain stages of the operation of the machine, to lock the press blanks against rotation during other stages of such operation, and to automatically release the completed press blanks from their respective supporting dies.

Other objects of my invention will be set forth in the following description and drawings which illustrate certain preferred embodiments, it being understood that the above statement of the objects of my invention is intended to generally explain the same without limiting it in any manner.

Fig. 5 is a vertical section on the line 5—5 of Fig. 4.

Fig. 6 is a detail view of a part of Fig. 5, showing the upper die in full lines in its lower position to which it is mechanically actuated, just before the air valve is opened to move said upper die downwardly to its final lower position. In Fig. 6 the broken-line position of the upper die shows its final position. In Fig. 5 said upper die is shown in its top position.

Figure 7:
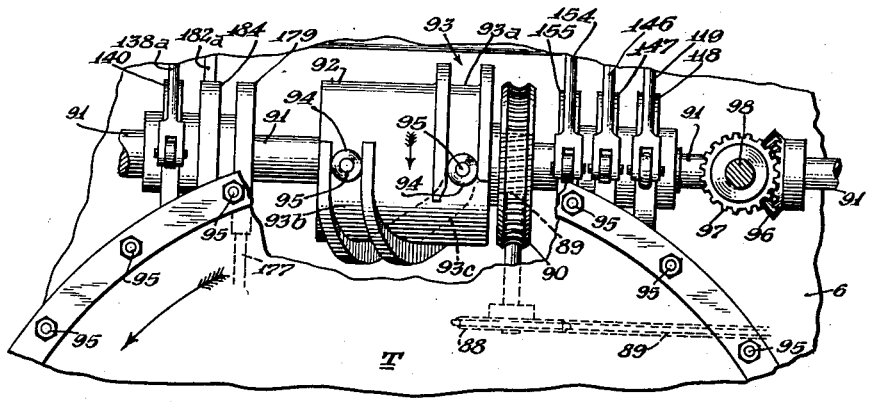

In Fig. 7 is a partial horizontal sectional view, partially in elevation, on the line 7—7 of Fig. 5.

Figure 8:
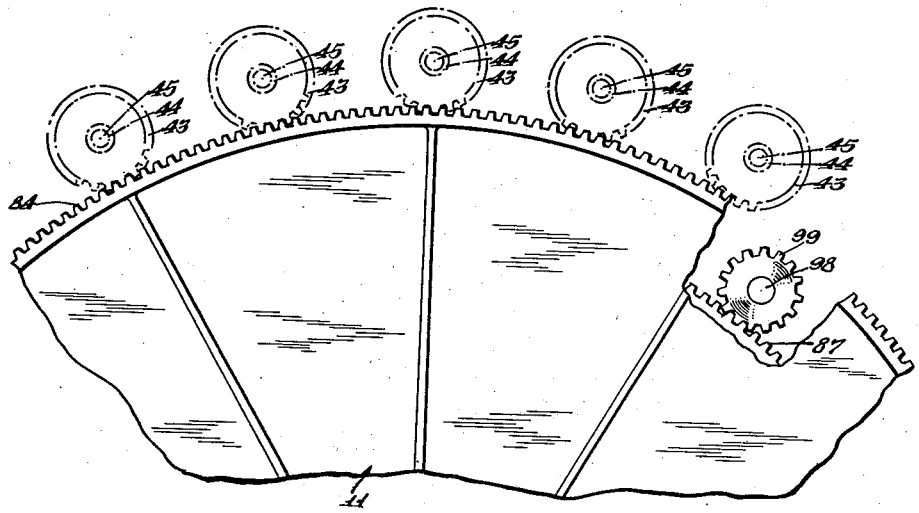

Fig. 8 is a partial horizontal plan view, on the line 8—8 of Fig. 5, part of the representation of the turntable having been broken away, in order to show the mechanism for driving the spindles.

Figure 4:
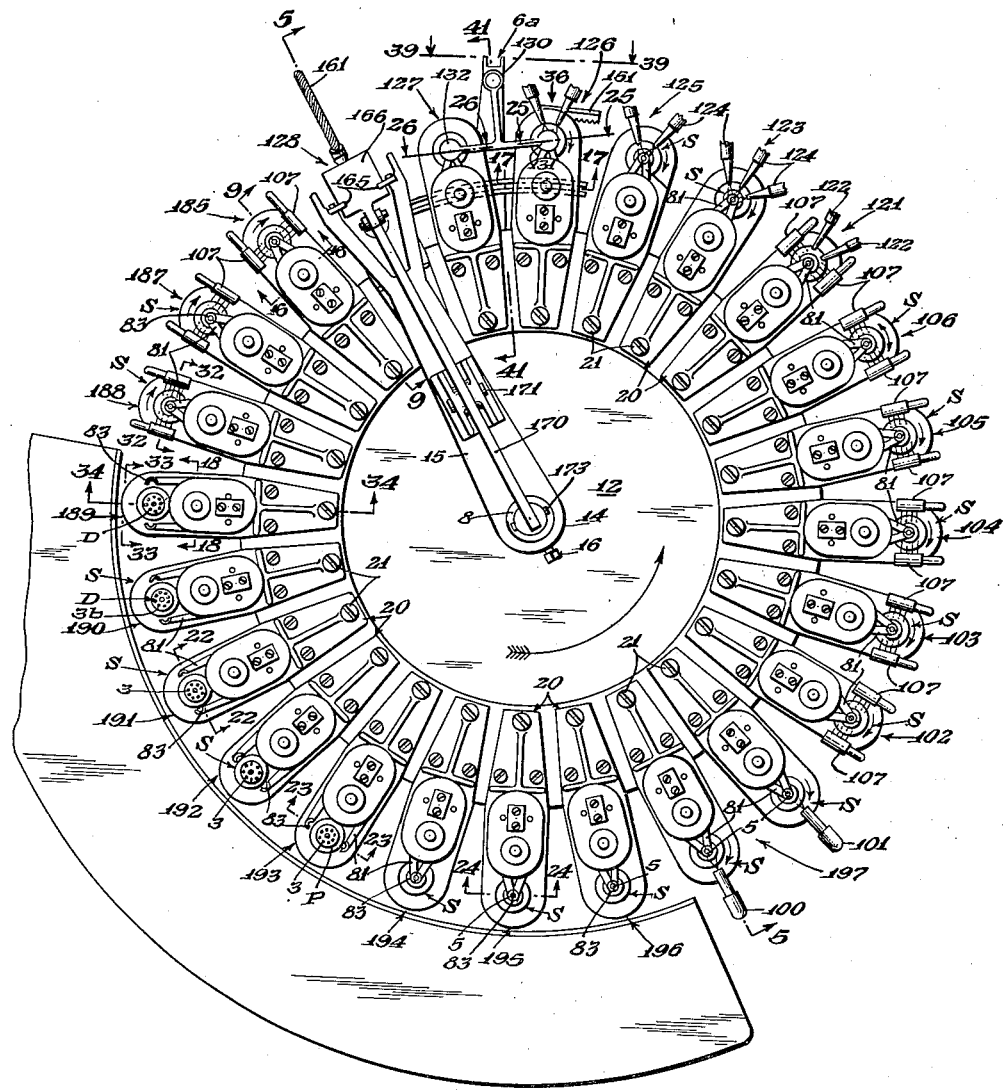
Fig. 4 is a top plan view of the improved machine. In this embodiment the machine has twenty-four spindle units, but the number of such units could be varied.
Figure 9:
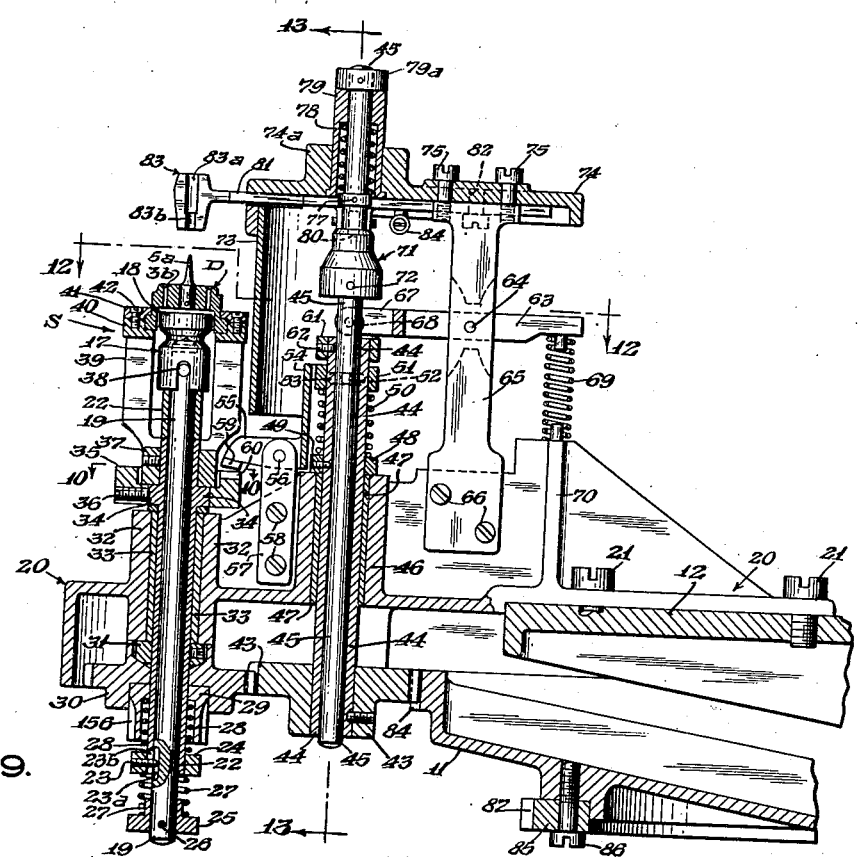

Fig. 9 is a vertical cross-section, partially in elevation, on the line 9—9 of Fig. 4.

Figure 10:
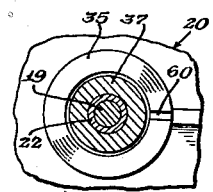

Fig. 10 is a horizontal sectional view, partially in elevation, in the line 10—10 of Fig. 9.

Figure 11:
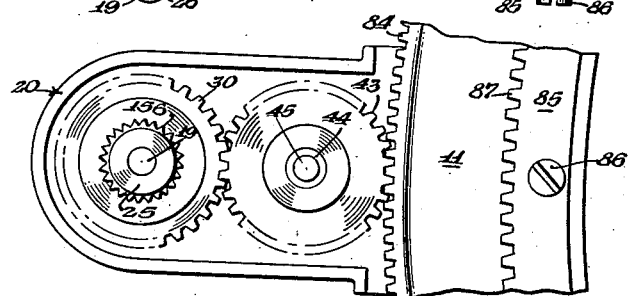

Fig. 11 is a partial bottom plan view of Fig. 9.

Figure 12:
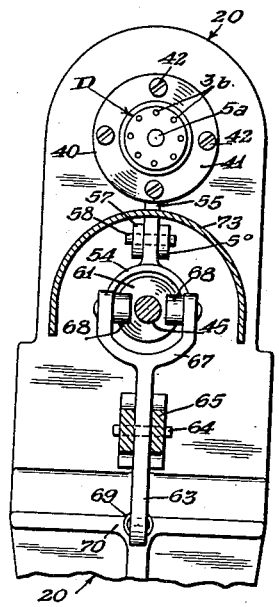

Fig. 12 is a plan view, partially in section, on the line 12—12 of Fig. 9.

Figures 13, 14:
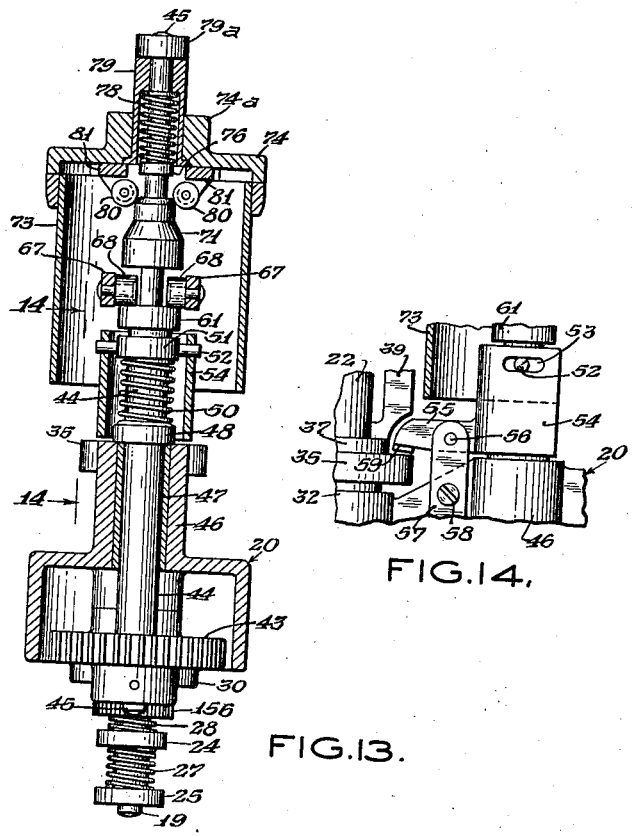

Fig. 13 is a vertical cross-sectional view, partially in elevation, on the line 13—13 of Fig. 9.

Fig. 14 is an elevation, partially in section, on the line 14—14 of Fig. 13.

Figure 15:
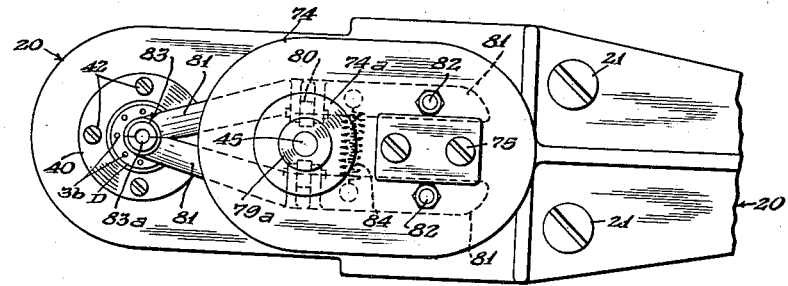

Fig. 15 is a top plan view of Fig. 9.

Figures 16, 17, 18:
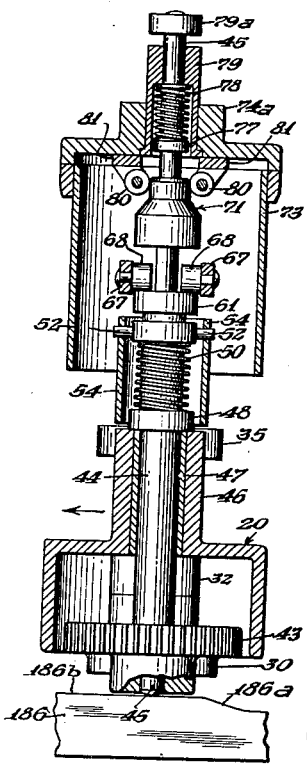

Figs. 16-18 are respective vertical cross-sections, partially in elevation, on the respective lines 16—16, 17—17 and 18—18 of Fig. 4.

Figure 19:
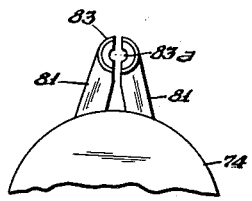
Figure 20:
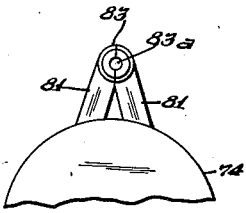
Figure 21:
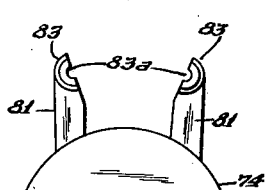

Figs. 19-21 are respective top plan views of Figs. 16-18.

Figs. 22-26 are respective vertical sections, partially in elevation, on the respective lines 22—22, 23—23, 24—24, 25—25 and 26—26 of Fig. 4.

Fig. 27 is a view similar to Fig. 22, showing a modified type of spindle head.

Fig. 28 is an enlarged partial detail sectional view of the terminal-supporting means of Fig. 27.

Fig. 29 is a vertical partial sectional view, partially in elevation, on the line 29—29 of Fig. 5.

Fig. 30 is similar to Fig. 29, showing the lower position of the upper die, to which it is mechanically actuated. In this position, the upper die is intermediate its top position and its final lower position.

Fig. 31 is a view similar to Fig. 30, showing the final lower position of said upper die.

Fig. 32 is a vertical partial sectional view on the line 32—32 of Fig. 4, showing how the fused press has been pushed upwardly from the position shown in Fig. 31, prior to the removal of the completed press from the apparatus.

Figure 33:
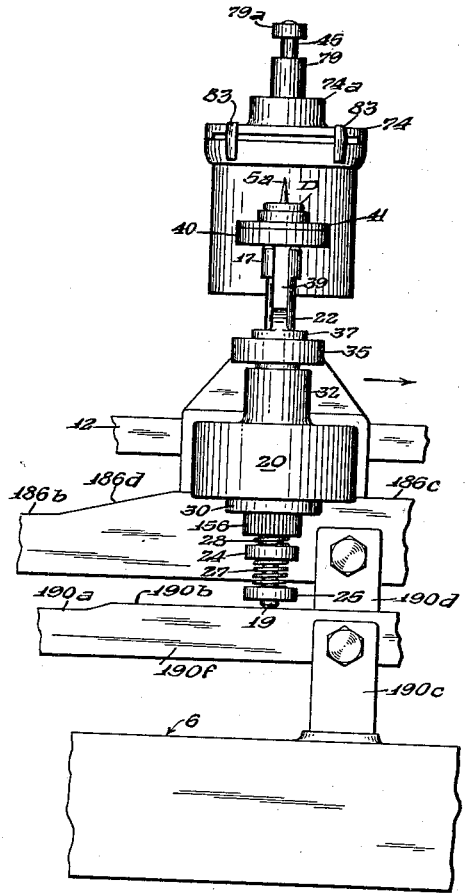

Fig. 33 is a vertical elevation, taken at the line 33—33 of Fig. 4.

Figure 34:
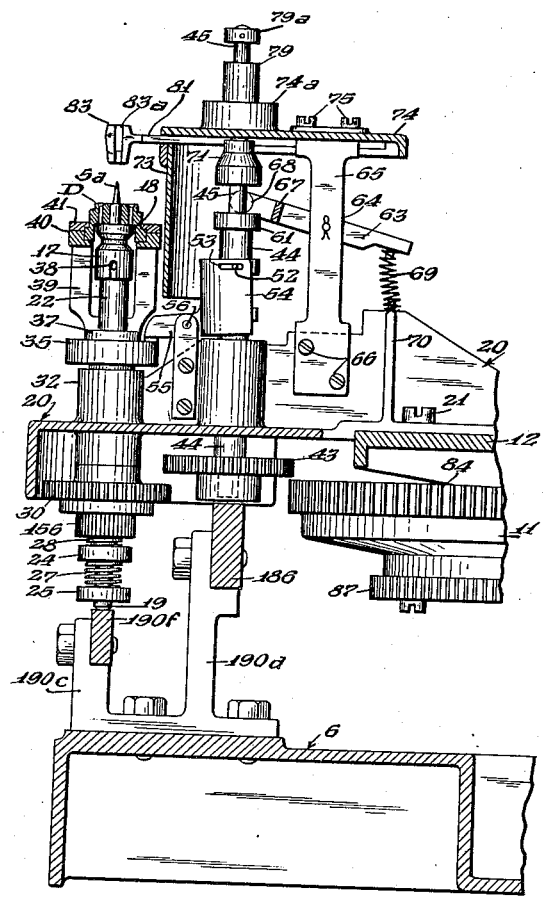

Fig. 34 is a cross-section, partially in elevation, on the line 34—34 of Fig. 4.

Figure 35:
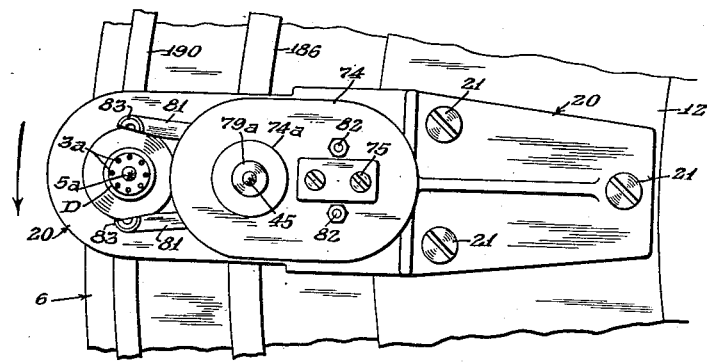

Fig. 35 is a top plan view of Fig. 34.

Figures 36, 37, 38:
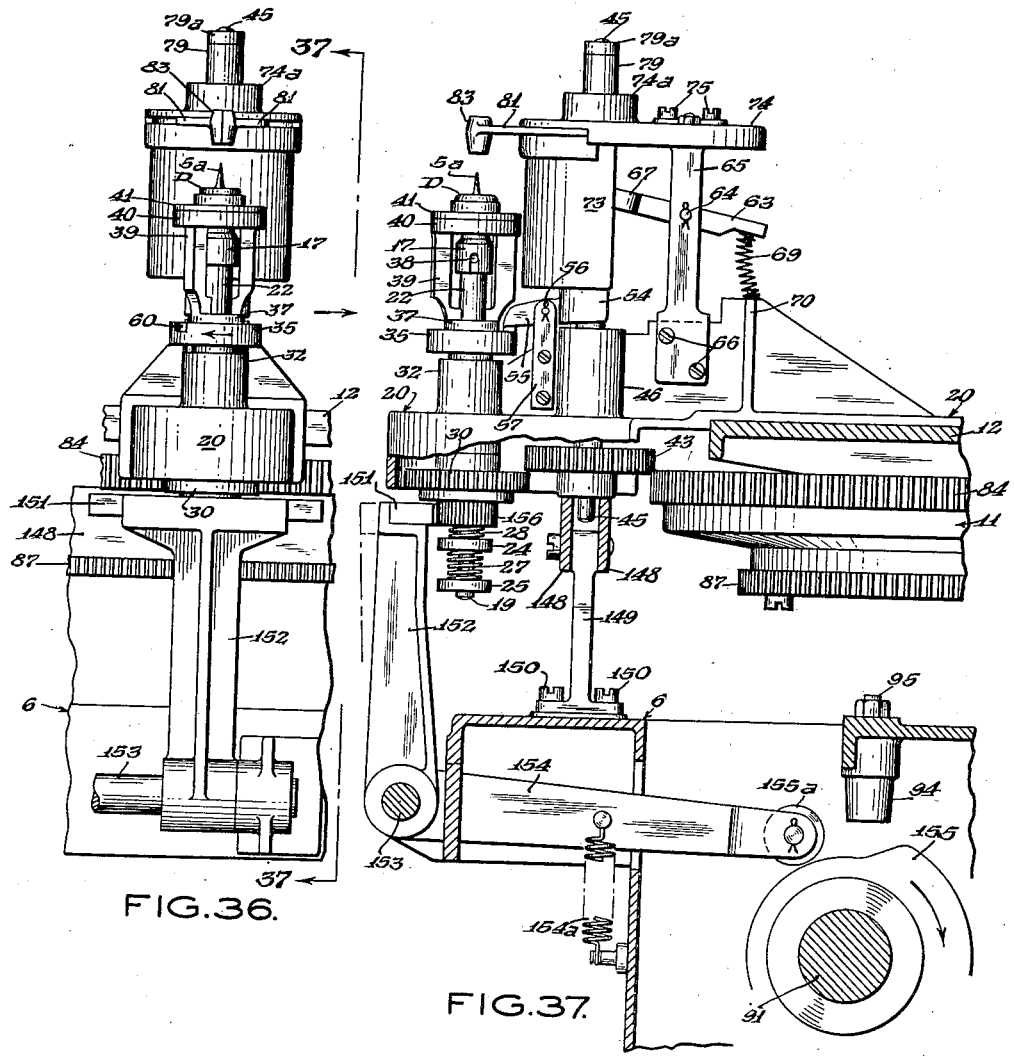

Fig. 36 is an elevation, taken at the arrow 36 of Fig. 4.

Fig. 37 is an elevation, at the line 37—37 of Fig. 36.

Fig. 38 is a top plan view of Fig. 37.

Figure 39:
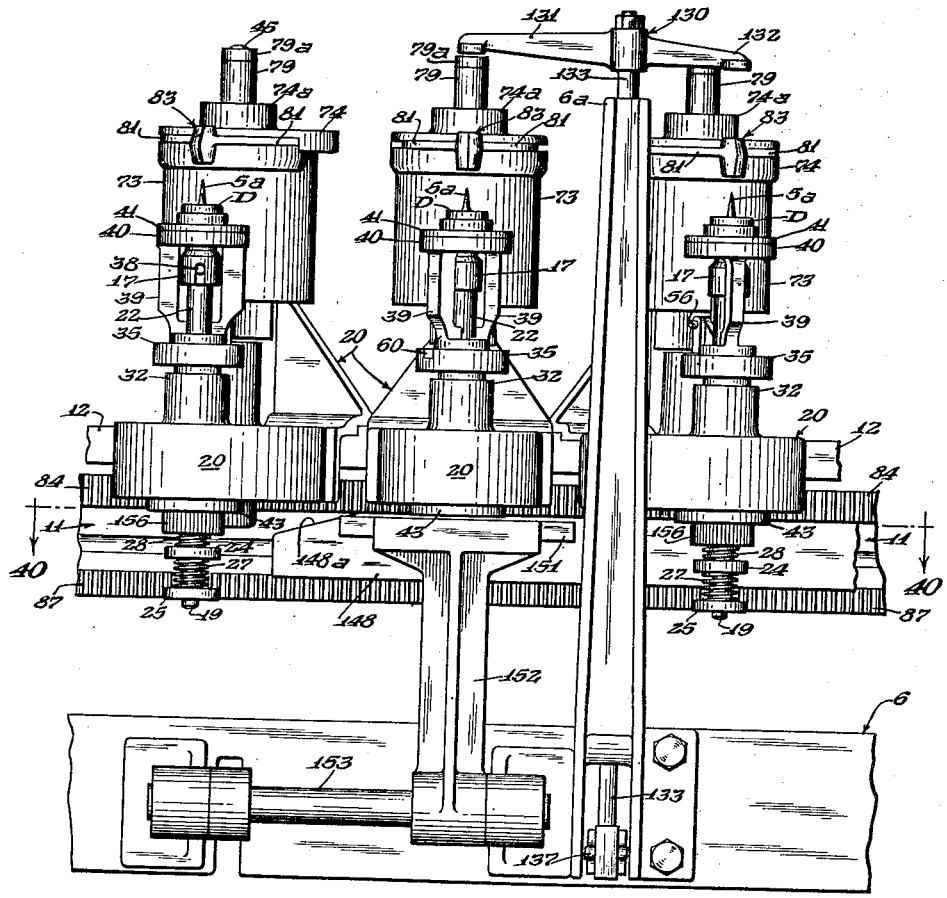

Fig. 39 is an elevation, at the line 39—39 of Fig. 4.

Figure 40:
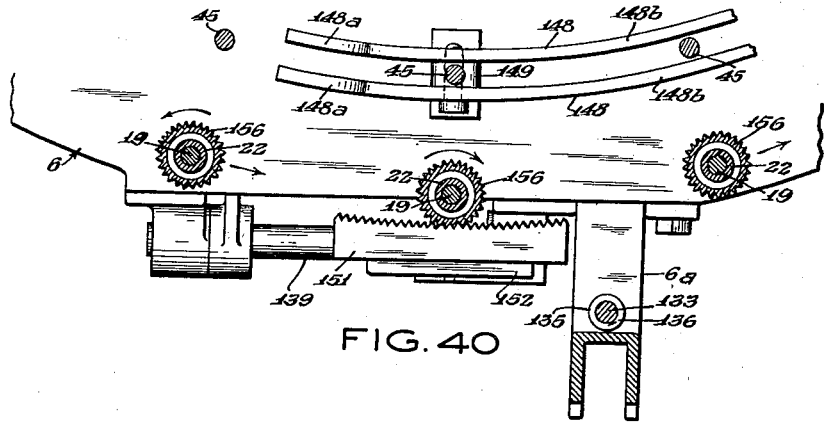

Fig. 40 is a horizontal sectional view, partially in elevation, on the line 40—40 of Fig. 39.

Fig. 41 is a vertical cross-section, partially in elevation, on the line 41—41 of Fig. 4.

Fig. 42 is a section, partially in elevation, on the line 42—42 of Fig. 41.

Fig. 43 is a partial diagrammatic plan view, showing the mechanism for operating the burners.

Fig. 44 is a plan view showing a part of one of the spindle units, and the burner mechanism used therewith.

Fig. 45 is a side elevation of Fig. 44.

Fig. 46 is a front elevation of one of the burners, taken along the line 46—46 of Fig. 44.

Figure 1:
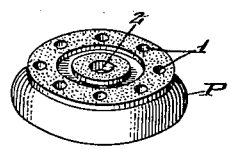
Fig. 1 is a perspective view showing the press member of an electronic tube, said press member being made of glass or other suitable material.
Figure 2:
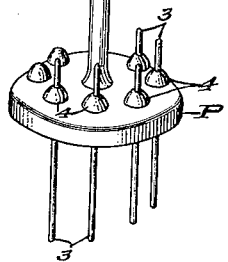
Fig. 2 is a perspective view showing the assembly of the press member with the terminal rods or wires and also with the upstanding integral glass tube which is used for producing the vacuum in the tube, and for sealing the tube.

Fig. 1 shows a conventional press or base portion P of an electronic tube which is used in radio receiving sets. This press is of conventional shape and it is provided with the usual holes 1 adjacent its periphery, and the usual central hole 2. The press P is usually made of glass. Fig. 2 shows the conventional wire or rod terminals 3 which project through holes 1, and also through the integral lugs 4 of the press P. Said lugs 4 are fused around the inner ends of the terminals 3, in order to provide a gas-tight enclosure. Fig. 2 also shows the conventional glass exhaust tube 5, which is sealed gas-tight to the wall of the central opening 2 of the press.

In general, the machine has a top turntable and a bottom turntable and an intermediate turntable. These turntables may be replaced by any suitable carriers. The top and bottom turntables are intermittently rotated in unison, and the intermediate turntable is rotated continuously. The three turntables are rotated in the same direction. Spindle units, which include lower dies, are mounted on the top turntable. The intermediate turntable has drive means for turning said lower dies, and said drive means are released or unmeshed at a predetermined point in the operation of the machine. An upper die is rapidly lowered and raised while the lower die is locked against turning movement, in order to shape the heated blank between the respective lower die and said upper die. Automatically operated jaws hold the tube 5 in proper position to be sealed to the wall of the central opening 2.

IMPORTANT MOVABLE AND STATIONARY SUPPORTING PARTS OF THE MACHINE, AND THE DRIVE MECHANISM FOR THE MOVABLE SUPPORTING PARTS

As shown in Fig. 5, the machine has a frame or base 6, which is fixed to any suitable support. The base 6 has a vertical hub 7, in which a hollow vertical column is located. This column 8 is fixed to hub 7 by one or more clamping screws 9, or in any suitable manner. The hub of an intermittently rotated first turntable T is keyed to a bushing 10, which is freely rotatable around hollow column 8. The hub of turntable T rests upon the hub 7. Suitable anti-friction bearings may be provided in any part of the machine.

A second turntable 11, which is continuously rotated in the same direction as the first and intermittently rotated turntable T, has a hub 11a which is freely turnable relative to bushing 10. The mechanism for turning the spindles of the spindle units of the machine is located in part on said second turntable. The hub 11a rests upon the top of the hub of the first turntable T.

The third and top turntable 12 has a hub 12a which is keyed to bushing 10 by one or more keys 10a, so that turntable T and bushing 10 and turntable 12 are rotated intermittently in unison. The spindle units are located on the top turntable 12.

All the turntables are rotated in the counter-clockwise direction which is indicated by the curved arrow in Fig. 4.

Fig. 5 also shows a bracket 15, whose hub is rigidly and detachably connected to the stationary column 8, by clamping screws 16 or other suitable means. Said bracket has a radial arm, on which the upper die and its associated parts are mounted for vertical movement.

Referring to Figs. 5 and 9, the second or intermediate turntable 11 has a ring gear 85 connected thereto by screws 86. This ring gear 85 has gear teeth 87.

Referring to Fig. 7, a sprocket 88 is driven by a chain 89 by means of a suitable motor. The shaft of said sprocket 88 has a worm 89, which meshes with and which actuates the worm gear 90 of the main shaft 91.

A cam 92 is keyed to said main shaft 91. Said cam has ribs which provide the cam groove 93. Said cam groove 93 comprises spaced end-portions 93a and 93b which are perpendicular to the axis of rotation of main shaft 91. The intermediate branch 93c of said cam groove has the shape of a portion of a helix, and said intermediate branch is inclined to the axis of rotation of main shaft 91. The end-portions 93a and 93b are spaced from each other in a direction which is parallel to the axis of rotation of main shaft 91.

The projection of said cam groove, in a plane perpendicular to the axis of rotation of main shaft 91, is a closed circle.

Fig. 5 shows two of the cam rolls 94, each of which is turnably mounted at the underside of the first turntable T, by means of a pivot-pin 95. In this particular embodiment, there are twenty-four spindle units S, and the first turntable T has twenty-four cam rolls 94, each cam roll 94 being associated with a respective spindle unit S. The number of spindle units can be varied. Therefore, the continuously rotating main shaft 91 intermittently turns the first turntable T by means of the cam groove 93 and the rolls 94, and the turntable T is locked between the intermittent movements thereof. When a respective roll 94 is located in either the end-branch 93a or the end-branch 93b, the turntable T is locked against movement. When the respective cam roll 94 is located in the intermediate branch 93c, the turntable T is rotated through a predetermined arc. As each roll 94 leaves the cam groove 92, the next roll is in position to enter the respective end-branch of the cam groove 93.

Since the first and third turntables T and 12 are respectively keyed to the rotatable bushing 10, said turntables T and 12 are rotated and locked in unison. As previously stated, the third turntable 12 supports the twenty-four spindle units S.

Referring to Figs. 7 and 8, the main shaft 91, whose axis of rotation is horizontal, is provided with a bevel gear 96 which meshes with the bevel gear 97 of a vertical shaft 98. This vertical shaft 98 is turnably supported in a suitable bearing which is connected to the frame of the machine.

Said shaft 98 has a gear 99, which meshes with the previously-mentioned gear teeth 87 of the intermediate turntable 11, so that said turntable 11 is continuously rotated in a predetermined direction.

The spindle units S

Said spindle units S are identical. As shown in Figs. 5 and 9, the parts of each units S are mounted in a combination bracket and housing 20, and said members 20 are respectively connected to the turntable 12 by screws 21 or the like.

The spindle 19 of each unit S is located in a sleeve 22.

As shown in Fig. 9, a collar 24 is fixed to sleeve 22 by a pin or screw 23. This pin 23 fits slidably in a vertical slot 23a of spindle 19. Said pin 23 acts as a slidable key. Spindle 19 and sleeve 22 therefore turn in unison, and spindle 19 can be moved upwardly relative to sleeve 22.

The normal position of pin 23 is shown in Fig. 9.

A second and lower collar 25 is rigidly connected to the spindle 19 by means of a pin or screw 26. A compression spring 27 has its lower end abutting the collar 25, and its upper end abutting the collar 24. A second compression spring 28 has its lower end abutting the collar 24 and its upper end abutting the inner wall of a vertical recess which is provided in the bottom of a pinion 29, which has teeth 156. The pinion 29 is fixed to an upper pinion or gear 30. This can be done by a drive fit or in any suitable manner. The pinions 29 and 30 are releasably connected to the sleeve 22 of spindle 19, in order to urn said sleeve in unison with said spindle, by means of a friction clutch. The pinon 30 and pinion 9 can turn in unison relative to sleeve 22 and spindle 19, when said friction clutch slips. A cone-type male clutch member 31 is rigidly connected to the sleeve 22, as for example, by a releasable clamping screw or a drive fit or the like. The upper face of said clutch member 31 is close to the bottom of hub 32 of member 20, so that sleeve 22 cannot be moved upwardly. The upper face of the gear 30 is provided with a recess which serves as a female clutch member. This recess may have a suitable friction lining. The springs 27 and 28 maintain these clutch members in operative contact. A bushing 33 is fixed in the hub 32 of member 20. This bushing 33 serves as a bearing in which sleeve 22 is revolved in unison with spindle 19. The sleeve 22 is provided with a head 34. A collar 35 is connected to said head 34 by one or more clamping screws 36 or the like. The head 34 of sleeve 22 rests upon an anti-friction washer, which is supported on the fixed bushing 33. The sleeve 22 is thus held against any vertical movement by its head 34, the aforesaid washer, and the male clutch-member 31. A collar 37 is located in the top recess of the collar 35, and said collar 37 is rigidly but detachably connected to the sleeve 22 by clamping screws or the like. A cap 17 is supported upon the top of the spindle 19, which projects above the sleeve 22. The cap 17 is provided with a vertical slot in which a lateral pin 38 of the spindle 19 is located, so that the cap 17 and the spindle 19 turn in unison. The cap 17 has a head 18. The collar 37 is provided with a pair of upstanding arms 39, which are provided at their upper ends with an integral collar 40. The lower die D of each unit S is supported by said collar 40. The flange of die D is fixed to collar 40 by means of a clamping-plate 41, which is connected to the collar 40 by means of screws 42. There is a clearance between the top-wall of head 18 and the adjacent lower wall of the die D. The spindle 19 and its head 18 can be moved upwardly from the normal position shown in Fig. 9 and Fig. 29, to the position shown in Fig. 32.

The die D is provided with suitable vertical bores 3b in which the operator can locate the terminals 3, before applying the press member P to the die D. The press member P and the terminals 3 are applied to the die D, in the manner shown in Fig. 23, after said press member P has been preheated, but while it is substantially rigid.

Referring to Figs. 5 and 9, the gear 30 meshes with the intermediate gear 43, which is releasably clamped or otherwise secured to a sleeve 44. A rod 45 is located slidably in the sleeve 44. The housing 20 is provided with a hub 46, in which a bearing-bushing 47 is fixed. The sleeve 44 can move freely relative to this bushing 47. A collar 48 normally abuts the upper end of the fixed bushing 47. This collar 48 is releasably fixed to the sleeve 44 by screws 49 or the like. A compression spring 50 has its lower end abutting the collar 48, and its upper end abutting a collar 51. The collar 51 and sleeve 44 are freely movable relative to each other. As shown in Fig. 13, the collar 51 is provided with a pair of laterally projecting pins 52 which are diametrically opposed. These pins 52 are located in the circumferentially elongated bores 53 of a yoke 54, which has a U-shaped horizontal cross-section. The yoke 54 has an integral lug 55, which is connected pivotally at 56 to a strap 57. As shown in Fig. 9, the strap 57 is rigidly connected by screws 58 to the housing 20. The integral lug 55 is provided with a reduced latch projection 59, which can enter a suitable recess 60 of the collar 35. This recess 60 is also shown in Fig. 10. When latch-projection 59 enters recess 60, the sleeve 22 and its spindle 19 are locked against turning.

The weight of yoke 54 normally holds it in the position shown in Fig. 9, in which the latch-projection 59 clears the recess 60.

Fig. 34 shows the yoke 54 in the position in which the latch-projection 59 enters the recess 60. The gear 43 is then unmeshed from gear 30 and the gear teeth 84 of turntable 11.

As shown in Figs. 9 and 13, a collar 61 is releasably rigidly connected by screws 62 or the like, to the top of the sleeve 44.

As shown in Figs. 9 and 12, a lever 63 is pivotally connected at 64 to a strap 65, which is rigidly connected by screws 66 to the housing 20. The lever 63 is provided with a yoke-shaped head 67, which is provided with pins upon which rollers 68 are turnably mounted. As shown in Fig. 13, these rollers 68 abut the top of the collar 61. A compression spring 69 has its upper end abutting the adjacent end of the lever 63. Said compression spring 69 is mounted upon the upper end of a vertical rib 70 of the housing 20, and a suitable stop is provided for the lower end of the spring 69. The compression spring 69 is under initial compression, and by means of the yoke 67 and the rollers 68 and collar 61, it downwardly urges the sleeve 44 and the gear 43, to the meshing position shown in Fig. 9. The collar 48 acts as a stop for preventing the downward movement of the sleeve 44 below the position shown in Fig. 9. Therefore the collar 61 is normally vertically spaced from the collar 51.

The rod 45 extends above the yoke 67. A cam 71 is fixed to the rod 45 by means of a pin 72. This cam 71 is located in a guard member 73, which has a U-shape in horizontal cross-section. This guard member 73 is connected by a drive fit or the like to a cap 74, which is rigidly connected to the head of the strap 65 of the housing 20 by means of the screws 75.

This cam 71 has a top projection whose upper end is tapered. Cam 71 can be raised to the intermediate upper position shown in Fig. 16, or to the top position shown in Fig. 18. This is done either by raising rod 45 relative to its sleeve 44, or by raising both the rod 45 and the sleeve 44.

Above the cam 71, the rod 45 is provided with a collar 76 which is rigidly connected thereto by means of a pin 77. A compression spring 78 has its lower end abutting the collar 76, and its upper end abutting the shoulder of a bushing 79 which has a drive seat in the hub 74a of the cap 74. The spring 78 yieldingly maintains rod 45 in the normal position shown in Fig. 9. A cap 79a is fixed to the top of rod 45, in order to prevent rod 45 from being moved below said normal position.

The cam 71 operates the associated cam-rolls 80. As shown in Fig. 13 and Fig. 15, these cam-rolls 80 are respectively turnably connected to arms 81, which are respectively pivotally connected at 82 to the cap 74. These arms 81 are respectively provided with half-round jaw members 83. A tension spring 84 is connected to arms 81 and it normally holds the jaw members 83 in contact. When the rod 45 is raised to the intermediate position shown in Fig. 16, the jaws are opened to the intermediate position shown in Fig. 19. When rod 45 is raised to its top position shown in Fig. 18, the jaws are separated to their maximum extent, as shown in Fig. 21.

The lever 63 extends through a slot or bore of the strap 65, said bore having sufficient clearance for the movement of the lever 63. The walls of this slot or bore guide the turning movement of the lever 63.

As shown in Fig. 22, the jaw members 83 are provided with top guide-recesses 83a, which form a guide for the insertion of the tube 5 by the operator, when the jaw members abut each other as shown in Fig. 24. Said jaw members 83 are also provided with recesses 83b, between whose walls the tube 5 can be firmly clamped.

In operating the machine, the jaw members 83 abut each other when the tube 5 is inserted by the operator between the walls of the top recesses 83a. This can be done easily, as sufficient clearance is provided. The vertical walls and the shoulders at the inner ends of recesses 83a then support the tube 5 and said vertical walls may grip the tube 5 lightly or not at all. This is shown in Fig. 24, which also shows the abutting edges 83c of the recesses 83b of said jaw members 83. When sufficient downward force is exerted by the member 131 upon the top of the tube 5, as illustrated in Fig. 25, the jaws 83 are slightly separated by said downward force so as to force the tube 5 through the bore which is formed by the recesses 83b. The vertical walls of the recesses 83b then tightly and frictionally grip the tube 5, between the ends of said tube 5. The recesses 83b may have suitable resilient linings. As previously stated, the jaw members 83 respectively have shoulders between the recesses 83a and 83c. These shoulders may be slightly tapered downwardly, so as to force the jaw-members 83 slightly apart from each other, when the machine first exerts downward pressure on tube 5.

The intermediate gear 43, which normally meshes with the gear or pinion 30, also normally meshes with the gear teeth 84 which are provided at the periphery of the continuously rotating intermediate turntable 11.

*Means for heating the press members*

The machine is also provided with a series of burner nozzles in which gas or other fuel can be burned, in order to heat the glass press members. These nozzles are mounted at fixed stations. Referring to Fig. 4, the burner nozzles 100 and 101 are held fixed at the respective stations which are designated by the reference numeral 197. Two burner nozzles 107 are located respectively at the stations 102, 103, 104, 105 and 106. These respective burner nozzles at said stations 102–106 inclusive, can be moved radially back and forth, relative to the common axis of rotation of the three turntables. Referring to Fig. 45, each nozzle 107 is rigidly fixed to a respective supply pipe 108, which is connected by a flexible conduit 109 to a suitable source of gas. Said burners may be replaced by any suitable heating means. The air is supplied to each burner nozzle 107 in the usual manner. Each nozzle 107 is connected by a cross-rod 115 to a vertical rod 110, which is rigidly connected to an arm 111. The two burner nozzles 107 at each of the stations 102–106 inclusive, are thus operated in unison. The arm 111 at each said station 102–106 inclusive is rigidly connected to a respective shaft 112, which is mounted turnably in a respective bracket 114, which is rigidly connected to the frame 6 of the machine. Each shaft 112 has the respective arm 111 keyed thereto, so that each shaft 112 turns in unison with its arm 111 and with the associated pair of burner nozzles 107. Adjacent shafts 112 are connected by arms 116 and 116a. Each arm 116a carries a coupling 117 and each arm 116 has an integral ball-shaped head which is located in a corresponding socket of the coupling 117.

As shown in Figs. 7 and 43, the shaft 91 is provided with a cam 118. An arm 119 is rigidly connected to one of the shafts 112, at any selected station. For this purpose the arm 119 can be cast integral with one of the arms 116. The arm 119 has a cam roller 120, which cooperates with the cam 118, so that the nozzles 107 are intermittently rocked back and forth in a radial direction in order to permit the press blanks to enter the respective stations, during the intermittent movements of the turntables 12 and T. During the intermittent turning movement of the turntable T, the burner nozzles are rocked to the broken-line position shown in Fig.

45, in order to clear the lower dies D. While the turntables T and 12 are maintained stationary, the nozzles 107 are moved to the full-line position shown in Fig. 45, in order to heat the respective blanks during the periods of rest of said turntables T and 12. A spring (not shown) maintains the roll 120 in contact with the surface of the cam 118.

A station 121 is provided with a pair of said burner nozzles 107. In addition, it is provided with a pair of supplemental burner nozzles 122, to which a mixture of gas and oxygen is supplied, in order to increase the temperature to which the respective press blank P is heated. The supplemental burner nozzles 122 are connected to the supports of the burner nozzles 107 at the station 121, so that the four burner nozzles at said station 121 are moved radially in unison.

The station 123 has three burner nozzles 124, to which a mixture of gas and oxygen is supplied, so as to increase the temperature to which the press blank P is heated. These nozzles 124 are also rocked radially, by the aforesaid means.

The station 125 has a pair of rockable burner nozzles 124, to which a mixture of gas and oxygen is supplied. The heaters at station 126 are identical with those at station 125. All the burner nozzles at the stations 102–106, and at stations 121, 123, 125 and 126 are rocked in unison. The respective press blank P reaches its highest temperature at the station 126, so that the glass is sufficiently soft at said station 126, in order to shape said blank. No heating means are provided at the station 127. The gears 43 remain in mesh at the successive stations 196–125 inclusive, in order to continuously rotate the dies D and the blanks in the first heating zone.

*The operation of the machine at stations 126, 127, 128*

Figure 3:
Fig. 3 is a front elevation of Fig. 2, partially in section.

Two identical and radially separated cams 148, one of which is shown in Fig. 17, are provided at stations 126 and 127. Each said cam 148 has a slope 148a at its anterior end, and a horizontal top surface 148b. As shown in Fig. 40, the anterior slopes 148a of said cams 148 are located anterior station 126. As shown in Fig. 3, said cams are fixed to an arm 149, which is fixed to the frame of the machine by screws 150.

These cams 148 force gear 43 upwardly to the position shown in Fig. 17, thus unmeshing the respective gear 43 from its gear 30 and also from the gear teeth 84 of the turntable 12. The lever 63 is also turned to the position indicated in Fig. 37. The gear 43 will be retained in said unmeshed position, as long as it slides on the horizontal surfaces 148b of said cams 148. As shown in Fig. 17 and Fig. 37, the pin 45 rides between the spaced cams 148, so that pin 45 remains in the position shown in Fig. 9. Therefore the cam 71 is not raised above the position shown in Fig. 9 and Fig. 13, and the jaws 83 are not opened by the cams 148. When gear 43 is thus unmeshed, the simultaneous upward movement of the collar 48 of sleeve 44 compresses spring 50 and raises collar 51, thus urging yoke 54 to the operative position which is shown in Figs. 34 and 37, so as to lock the spindle 19 and the die D against turning.

When the gear 43 is thus unmeshed and the yoke 54 is thus actuated, latch-projection 59 may be out of registration with recess 60.

Auxiliary means are therefore provided at station 126, in order to turn the spindle 19 and its sleeve 22, until latch-projection 59 registers with and enters the recess 60.

As shown in Fig. 4 and in Figs. 36–38, a rack 151 is provided at station 126.

As shown in Fig. 37, the rack 151 is mounted at the upper end of an arm 152, which is pivoted at 153 to the frame 6. The arm 152 has a rigidly connected leg 154, which has the usual cam roll 155a, which is operated by cam 155 of shaft 91. The tension spring 154a holds the roll 155a in contact with cam 155. The rack 151 meshes with the teeth 156 of pinion 29. Rack 151 turns spindle 19 in a direction reverse to the direction in which spindle 19 is turned by gear 43, when this is in mesh with gear 30. Before the respective lower die D comes to rest at station 126, its spindle 19 and sleeve 22 and locking-collar 35 are turned 360°, in order to ensure the entry of latch-projection 59 into recess 60 and the locking of said die D. The friction clutch between gear 30 and sleeve 22 functions in the usual manner to relieve the stresses which result from the meshing and unmeshing of gear 43, and the change in direction of rotation of sleeve 22.

After the respective die D is stationary and locked against turning at station 126, the tube 5 is forced downwardly at said station from the position shown in Fig. 24 to the position shown in Fig. 25.

This is done by the mechanism shown in Figs. 39 and 41.

An arm 130 has a hub which is fixed to the vertical rod 133, which is slidably guided in the arm 6a of frame 6. Said arm 130 has legs 131 and 132, which have lateral heads. The leg 132 is shorter and lower than leg 131. A collar 135 is releasably fixed to rod 133 by pin 136. A compression spring 134 normally maintains rod 133 in the position indicated by the broken-line position of leg 132 in Fig. 41. The yoke-shaped head of a lever 138 embraces the pin 137 of rod 133.

Lever 138 has an arm 138a, whose cam roll 140a abuts the surface of cam 140 of shaft 91. The leg 131 is located at station 126 and the lower leg 132 is located at station 127. The cam 140 thus downwardly moves the rod 133, and the legs 131 and 132.

The head of leg 131 moves tube 5 downwardly at station 126. The jaws 83 open slightly and sufficiently under the pressure which is exerted on tube 5 to permit this, and said jaws 83 grip the tube in the position shown in Fig. 25.

The leg 132 is operated at station 127 by cam 140, and members 133, 138 and 138a, while the die D is stationary, to force tube 5 to the position shown in Fig. 26 and Fig. 29.

The tube 5 slides between the closed jaws 83, while said tube is actuated by arm 130.

*Mechanism at pressing station 128*

The upper die 129, which is located for vertical movement at pressing station 128, has a series of bores 142, which receive the upper ends of the terminals 3. Said die also has a bottom recess 129a, and a central bore or recess 141, and a stem 29.

Fig. 5 shows an air-inlet line 158 which is connected to any suitable source of compressed air. This source is not shown. The pipe 158 fits into a port of the valve casing 157. The valve casing 157 has a conventional two-way valve which controls the ports of the pipes 159 and 160. This valve is not shown because it is well-known per se. The pipes 159 and 160 operate alternately as pressure pipes and as exhaust pipes in the usual manner. The pipes 159 and 160 are connected by flexible pipes 161 and 162 to the ends of a cylinder 163, in which the usual piston is provided. This piston is not shown. This piston is connected to the piston rod 164, to which the upper die 129 is connected. The cylinder is lowered by mechanical means until the die 129 is in the position shown in Fig. 30, prior to operating the piston rod 164. For this purpose, and as shown in Fig. 5, the cylinder 163 is provided with collars 166 and 167. Each of these collars has a lateral dove-tail projection, and said projections slide in the vertical slot of a corresponding fixed guide 165 which is secured to member 15. A link 168 is pivotally connected at 169 to the top collar 166. A lever 170 is pivoted at 171 to a lug of the bracket 15 which is connected to the frame of the machine. The lever 170 is pivotally connected at 172 to the link 168. The lever 170 has a notched end, and the pin 173 is located in said notch. The pin 173 is connected to the rod 174, which is slidably located in the column 8. A compression spring 175 has its upper end abutting the lower end of the column 8, and its lower end abutting a collar 176 which is fixed to the lower end of the rod 174. A lever 177, which is pivoted to the frame of the machine at 178, is operated intermittently by the cam 179 of the shaft 91. For this purpose, lever 177 has the leg 177a, which has the cam roller 177b.

The valve in the casing 157 is provided with the usual actuating rod 180, which has the usual compression spring 181, which biases said valve to normal closed position. The valve-rod 180 is operated to open said valve by the lever 182, which is pivoted at 133 to the frame of the machine by means of the cam 184, which is shown in Fig. 7. Lever 182 has the leg 182a, which has the usual cam roll.

Hence, at station 128, the upper die 129 is first moved mechanically to the position shown in Fig. 30, so that the top of tube 5 is located above the recess 129a, and the top of said tube 5 is located in recess or bore 141 of die 129.

This is done by means of cam 179 and its associated parts, which lower the cylinder 163, until die 129 is in the broken-line position shown in Fig. 6.

Air is now admitted successively to the upper and lower ends of cylinder 163 by cam 184, thus rapidly lowering and raising piston rod 164 and die 129. The heated blank is thus rapidly shaped and united with the lower end of tube 5. The bore 141 of die 129 may be wholly open, or it may have an end-wall which downwardly presses tube 5 to its final position, when upper die 129 is lowered by the piston rod 164 to its final lower position.

In order to facilitate the rapid down-and-up movement of upper die 129, the jaws 83 are opened so as wholly to release the tube 5 during this rapid movement. Such open position of the jaws is shown in Fig. 30. The bore 141 holds tube 5 in proper centered position at this stage, so that the jaws 83 can be in inoperative position.

The jaws 83 are rapidly moved to inoperative position by means of the rod 143, which is shown in Fig. 5. This is slidably located in a hub of frame 6. Said rod has a head 143c. When rod 143 is raised, its head 143c raises pin 45 sufficiently so that its cam 71 is moved at least to the position shown in Fig. 16, so as to open the jaws. The head 143c may be of the same size as rod 45, so that head 143c can enter the bore of sleeve 44, thus raising cam 71 to the position shown in Fig. 18, thus separating jaws 83 to the maximum extent shown in Fig. 22.

The rod 143 is raised by arm 144, which is rigidly connected to the turnable pin 145, which is turnably located in a bearing of frame 6. Arm 146 is rigid with pin 145. Said arm 146 has the usual cam roll which abuts the cam 147 of shaft 91, so that rod 143 is moved to open the jaws 83 at the proper time.

Operations after the pressing station

Between the pressing station 128 and the next station 185, the hub of the gear 43 of the respective spindle unit rides off the cams 148. Also, the rod 45 is raised relative to gear 43 by the cam 186. The rod 45 is raised by the entrance slope 186a of said cam 186, which is shown in Fig. 16, so that the rod 45 rides on the lower horizontal surface 186b of cam 186, at stations 185, 187, and 188. The gear 43 remains in mesh at said stations 185, 187, and 188, so that the respective die D is rotated at said stations.

As shown in Fig. 34, cam 186 is fixed to the arm 190d, which is fixed to the frame 6. While the rod 45 rides on the surface 186b of cam 186, the jaws 83 are in the intermediate open position shown in Fig. 19, so that tube 5 can rotate freely in unison with die D and the blank, at said stations 185, 187 and 188. Additional burners 107 are located and rocked at said stations 185, 187, and 188, in order to heat the blank, so as to finish and anneal the blank.

When the respective spindle unit leaves the station 188, the gear 43 and the rod 45 ride up the intermediate slope 186d of the cam 186, to the top horizontal surface of 186c of cam 186. As shown in Fig. 18, this unmeshes gear 43, and the jaws are opened to their maximum extent, as shown in Fig. 21.

Likewise, between stations 188 and 189, and preferably after the respective spindle 19 has stopped turning, said spindle 19 is raised to the position shown in Fig. 32, thus raising the press relative to the respective die.

The spindle 19 is thus raised by the cam 190f, which is fixed to arm 190c, which is fixed to the frame 6. Said cam 190f has an entrance slope 190a and a horizontal top surface 190b, along which the bottom of spindle 19 slides.

Therefore, when the respective spindle unit is brought to rest at station 189, the jaws 83 are opened to their maximum extent, the respective spindle 19 is stationary, and said spindle 19 is in its upper position.

At the station 190, the parts of the spindle unit are in the identical positions of station 189, so that one of the operators can remove the completed blank either at station 189 or 190. The completed press may be placed by the operator on a conveyor belt or the like (not shown). The press may be subjected to any additional annealing or other finishing operation after it has been removed from the machine. At either of the stations 189 and 190, the blank is sufficiently rigid so that it can be handled by a pair of tongs.

The relative positions of the parts of the respective spindle unit remain substantially unchanged at stations 191, 192, 193, so that the jaws remain fully open and the respective spindle does not rotate at said stations. However, spindle 19 may ride off the cam 190f between stations 190 and 191, so that an operator can insert additional terminals 3 in the bores 3b of the respective die D, at either of the stations 191 or 192.

An unheated or preheated glass blank may be placed on the die D at station 193.

Between station 193 and station 194, the gear 43 and the rod 45 ride off the top surface 186c of the cam 186, so that the jaws 83 are closed at station 194 and the succeeding stations, until the blank arrives at station 128, when the cycle is repeated. The die D may be rotated at stations 194 and 195, or the respective gear 43 may remain unmeshed at stations 194 and 195, so that the respective die D is not rotated at said stations 194 and 195. This can be done by shaping the cam 186, which may or may not have a lower horizontal surface 186b at stations 194 and 195. A tube 5 is inserted by the operator, between the jaws 83, at either station 194 or station 195.

The respective spindle 19 is revolved in any event, beginning at station 196, and the tube 5 may also be inserted at station 196. The respective spindle 19 may thus remain locked against turning, at each of the stations 189-195 inclusive, by means of the latch mechanism, which is released between stations 195 and 196. This is preferred, instead of turning the respective spindle 19 at the stations 194 and 195.

As shown in Fig. 46, each burner nozzle 107 is provided with a series of perforations 107a through which the jets of flame issue.

In the modified device shown in Fig. 27 and Fig. 28, the modified head 18a, which corresponds to the head 18 of Fig. 22, is provided with lateral notches 18b, so as to accommodate terminals 3a which are longer than the companion terminals 3. The bottom ends of the longer terminals 3a will rest upon the bottom wall of the notch 18b.

*Operation of the machine*

The operators service the machine at stations 189, 190, 191, 192, 193, 194, and 195, and also at 196. At the successive stations 189-193 inclusive, the completed press is removed, and additional terminals and blanks are inserted in or placed on the respective lower dies D. At said stations 189-193 inclusive, the die-supports for the respective dies D are locked against rotation and the respective jaws are separated to their maximum extent. At said stations 189-193 inclusive, the respective gears 43 and the rods 45 ride on the top surface 186c of cam 186. The jaws 83 are closed at stations 194, 195, and 196, but the respective die-supports for the dies D preferably do not turn at said stations, although said die-supports may be turned, if desired. The turning of the die-supports at 194, 195 and 196 can be eliminated by providing cam 186 with a lower surface 186b at said three stations, thus keeping the respective gears 43 in their unmeshed positions, but closing the jaws. Additional tubes 5 are inserted between the jaws, in the position shown in Fig. 24, at said three stations 194, 195, 196. The gears 43 ride off the cam 186 between station 196 and the next succeeding station 197, thus meshing the respective gear 43 with the respective gear 30 and with the gear 84. The respective dies D are rotated continuously by the continuously rotating gear 84 and the respective gears 43 and 30 at the two stations 197, and also at stations 102, 103, 104, 105, 106, 121, 123, and 125. Each die-support is automatically unlatched when its drive becomes operative. The heaters at stations 102, 103, 104, 105, 106, 121, 123, 125, and 126 are located in the first heating zone of the machine. At the stations 102, 103, 104, 105, 106, and 121, the heaters 107 direct their flames into contact with the top walls and the depending walls of the respective blanks, said blanks being continuously rotated about their respective axes. Said heaters 107 obstruct the movement of the lower dies, when said heaters are in their inner or operative positions, which are shown in Fig. 4, and also in full lines in Fig. 45. The cam 118 of the continuously rotating main shaft 91 rocks the burners 107 to their outer or inoperative positions, in order to clear the dies D as said dies are moved to their respective stations. Said cam 118 permits the burners 107 to move inwardly to their operative positions while the dies D are at their respective stations and the turntable 12 is held stationary, and said cam 118 moves the burners 107 outwardly to non-obstructing positions when the dies are moved away from their respective stations to the next succeeding stations, by the intermittent movement of turntable 12.

The turntables T and 12 are moved during a part of the period of each complete rotation of the main shaft and they are locked against movement during the remaining parts of said period. For example, a die D is located at a station while the respective roll 94 is being moved in branch 93b of cam groove 93. The die is moved to the next station while the respective roll 94 is moving in the inclined branch 93c of the cam groove 93. The die D is then maintained at the next station while the respective roll 94 is moving in branch 93a of cam groove 93.

The auxiliary burners 122, 124, and the burners at station 126 are also controlled by cam 118.

Between the stations 125 and 126, the respective gear 43 is unmeshed by the cams 148, while the respective rod 45 remains in its lower position, so that the means for holding the tube remain closed and operative.

After the respective gear 43 has been unmeshed, the rack 151 is moved to operative position by cam 155, thus turning the die-support of the respective die D, until said die-support is latched against turning movement. The friction clutch slips as soon as the die-support has been latched. Hence, when the respective die D is in station 126, it is locked against turning.

After the respective die D has thus been locked against turning, and while turntable 12 is stationary, the cam 140 actuates the arm 130 downwardly, so that the head of its leg 131 moves the respective tube 5 to the position shown in Fig. 25. The jaws are not opened by any cam or the like during this first downward movement of the respective tube 5. The jaws open slightly under the pressure of leg 131. The upper parts of jaws 83 in effect form a socket in which the tube can be inserted by the operator with little or no force. The tube 5 is now gripped between the lower parts of jaws 83. Said upper and lower parts of jaws 83 form aligned jaw-holding means.

The rack 151 is moved out of mesh with the additional gear teeth 156, before the respective spindle unit is moved from station 126 to station 127. The station 127 has no heating means. The die D remains locked against turning at station 127.

The cam 140 again lowers arm 130 while the turntable 12 is stationary, so that the head of the lower leg 132 moves the tube 5 to the position shown in Figs. 25 and 29, in which the tube is still spaced from the top of the soft heated glass blank.

The respective unit is now moved to station 128, with its die-support still locked against turning and the jaws still in the position which is shown in Figs. 26 and 29.

The cam 179 now lowers the cylinder 163 until the upper die 129 is moved to the position shown in Fig. 30, in which the upper end of the tube 5 enters the central opening 141 of the upper die 129. The tube 5 is now centered by the projection 5a of the die D and by the wall of said central opening.

The jaws are quickly opened to the position shown in Fig. 30, by means of the cam 147. Said cam 147 can be turned to open the jaws, as soon as the upper end of the tube 5 enters the opening 141. The opening of the jaws permits the tube 5 to drop under its own weight to the position shown in Fig. 30, in which it rests on the top of the heated glass blank.

The cam 184 now controls the supply of compressed air to cylinder 163, so that the upper die 129 is moved rapidly down from the position shown in Fig. 30 to the position shown in Fig. 31 and then back to the position shown in Fig. 30.

The jaws are held open by cam 147 during this down-and-up movement of die 129 under the force of the compressed air. The bore 141 may or may not have an end-wall which presses the tube 5 against the heated blank, at the completion of the downward movement of die 129 to the position shown in Fig. 31.

As soon as the piston moves die 129 back to the position shown in Fig. 30, the jaws are again closed, by cam 147.

The cylinder 163 is then moved back to its top position, this movement being controlled by cam 179.

All the operations on the blank at the pressing station 128 are performed while the turntable 12 is stationary.

The respective spindle unit is now moved to station 185. Between stations 128 and 185, the respective gear 43 rides off the cams 148 and the rod 45 rides up the slope 186a of cam 186, thus opening the jaws to their intermediate open position which is shown in Fig. 9, while the respective gear 43 remains in mesh.

The respective dies D are rotated in unison with their blanks at stations 185, 187, and 188, the heaters 107 at said stations being controlled by cam 118 in the manner previously described. The stations 185, 187 and 188 are in the second heating zone of the machine.

Between stations 188 and 189, the respective gear 43 and the rod 45 are moved up slope 186d to the top surface 186c of cam 186, thus unmeshing the gear 43, and fully opening the jaws.

In addition, the bottom of the respective spindle 19 rides up the slope 190a of the cam 190f to the top surface 190b of said cam, so that the completed press is raised to the position shown in Fig. 32, at station 189.

The spindle 19 may ride off the cam 190f, between the stations 190 and 191. The gear 43 and the rod 45 may ride completely off the cam 186 between stations 193 and 194, because the tube can be readily inserted between the jaws 83, even if the respective lower die D is rotating.

By using a suitable cam, gear 43 can be maintained out of mesh, from station 189 to station 196 or the next station 197.

The timing and action of the movable and stationary cams and numerous other factors can be varied as desired.

The releasable drive for rotating the lower dies may be of any type, mechanical, electrical, or fluid-driven.

Many modifications can be made in the machine, depending on the type of press which is to be manufactured. Machines can be made according to the invention, which omit parts described herein, depending on the type of press. The invention therefore includes numerous subcombinations, and many changes and omissions can be made without departing from the spirit of the invention.

The turntable 12 is held stationary while the respective supports for the lower dies are located at the respective stations, in order to give the operator sufficient time to remove the completed presses, to load the respective lower dies with terminals, and to perform other necessary operations. At each heating station, each support for the lower die is continuously rotated around its own axis, even during the period in which the turntable 12 is locked against rotation. Therefore the axis of rotation of each die D is maintained stationary with respect to the axis of rotation of the turntable 12, during a predetermined period.

We claim:

1. A machine for making the presses of tubes comprising a carrier, said carrier being movable between a pressing station and a heating zone, mechanism adapted to actuate said carrier, a die-support mounted on said carrier, said die-support being turnable relative to the carrier about a predetermined axis, a first die connected to said die-support and turnable in unison therewith, said first die having terminal-holding means adapted to hold a terminal in upstanding position, heater-means located in said heating zone anterior said station, a second die located at said pressing station, said second die having terminal-receiving means adapted to receive said terminal when the second die is moved towards the first die to blank-pressing position, operating means adapted to rotate said die-support in said heating zone and also to hold said die-support against rotation when said first die is in said blank-pressing position, additional means adapted to move the second die to blank-pressing position and in a path in which the free end of the terminal enters said terminal-receiving means.

2. A machine for making the presses of tubes comprising a carrier, said carrier being movable between a pressing station and a heating zone, mechanism adapted to actuate said carrier, a die-support mounted on said carrier, said die-support being turnable relative to the carrier, a first die connected to said die-support and turnable in unison with said die-support, said first die having terminal holding means adapted to hold a terminal in upstanding position, heater-means located in said heating zone, a second die located at said pressing station, said second die having terminal-receiving means adapted to receive said terminal when the second die is moved towards the first die to blank-pressing position at said pressing station, operating means adapted to rotate said die-support in said heating zone and also to hold said die-support against rotation when said first die is in said blank-pressing position, said mechanism being adapted to drive said carrier intermittently, means adapted to hold the carrier stationary when a die-support is located at said pressing station, the second die being supported independently of the carrier and having guide-means adapted to guide said second die in a straight-line movement towards its blank-pressing position, said operating means being adapted to hold said first die with its terminal-holding means aligned with the terminal-receiving means at said pressing station.

3. A machine for making the presses of tubes, comprising a carrier, said carrier being movable between a pressing station and a heating zone, a die-support mounted on said carrier, said die-support being turnable relative to the carrier, a first die connected to said die-support, heater-means supported independently of said carrier and located in said heating zone, said first die having an upstanding tube-centering device at its central position, frictional tube-holding means mounted on said carrier above said die-support, said tube-holding means being movable relative to said carrier to tube-holding position and out of tube-holding position, the tube which is held by said tube-holding means being longitudinally movable relative to said tube-holding means when said tube-holding means are in tube-holding position, said die having terminal-holding means spaced from said tube-centering device, a second die located at said pressing station and supported independently of said carrier, mechanism adapted to actuate said carrier intermittently, means adapted to hold the carrier stationary when a die-support is located at said pressing station, guide-means adapted to guide the second die in a straight-line movement when the second die is moved to blank-pressing position, the second die having a first opening to receive the tube which is held by said tube-holding means and also having a second opening to receive the terminal, when the second die is moved to blank-pressing position, operating means adapted to rotate said die-support around said predetermined axis in said heating zone and also to hold said die-support against rotation at said pressing station and with said tube-centering device aligned with said first opening of the second die and with said terminal-holding means of the first die aligned with the second opening of the first die, additional operating means adapted to move the second die towards the first die to blank-pressing position when said parts have been thus aligned and then to move the second die away from the first die so as to release said tube and terminal, additional operating means adapted to move the tube-holding means out of operative position during said movement of the second die towards the first die and as soon as the respective end of the tube is located in said first opening and to move the tube-holding means back to operative position during the movement of the second die away from the first die and while said respective end of the tube is still located in said first opening.

4. A machine for making the presses of tubes, comprising a carrier, drive means adapted to actuate said carrier intermittently, a series of spaced spindle units mounted on said carrier, each spindle unit having a rotatable die-support which can turn relative to the carrier around a respective predetermined axis, a die mounted on each die-support and turnable in unison with the respective die-support, each said die having openings adapted to receive tube-press terminals, each die-support having a first gear, gear-driving means adapted to rotate said gears and mounted to rotate independently of said carrier, heating means mounted independently of said carrier and of said gear-driving means and adapted to heat blanks which are mounted on said dies, second die-means located after said heating means and adapted to depress tubes into engagement with blanks which are supported on said dies, control means adapted to engage the respective first gears with said gear-driving means while the respective spindle units are adjacent said heating means and to disengage said first gears from said gear-driving means before said second die-means have been moved to their bottom position, the second die-means being mounted independently of said carrier and of said gear-driving means.

5. In a machine for making the presses of tubes, the combination of a carrier, a spindle unit mounted on the carrier, said spindle unit having a die-support which is rotatable relative to the carrier, a die connected to said die-support, the unit also having jaw-means movably connected thereto, said jaw-means having respective upper parts which are shaped to form a holder in which the lower end of a tube can be held when said jaw-means are closed, said jaw-means also having respective lower parts which are shaped to grip a tube between said lower parts when the jaw-means are closed, said lower parts being shaped to grip a tube of predetermined size more tightly than said upper parts, both said jaw-means being movable in substantial unison from respective operative positions to respective inoperative positions, said machine having a heating zone in which heating means are located, tube-depressing means actuated to depress a tube which is held by said upper parts to a position in which the tube is held by said lower parts.

6. A machine for making the presses of tubes, comprising a turntable, a drive-shaft having means adapted to rotate the turntable intermittently through a predetermined angle which has a definite ratio to a predetermined angle of rotation of the drive-shaft, spaced spindle units mounted on the turntable, each spindle unit having a die-support which is rotatable relative to the turntable, each die-support having a first die which rotates in unison therewith, a second die mounted independently of said turntable at a pressing station, said second die being movable relative to each first die, actuating means adapted to move said second die into pressing relation with the respective first die which is located at the pressing station while the turntable is stationary and also to move the second die to a position in which it clears the elements which are supported on the turntable while the respective first die is located at the pressing station and the turntable is stationary, and means adapted to rotate said die-supports in advance of said pressing station and to hold the die-supports against turning at said pressing station.

7. A machine for making the presses of tubes, comprising a turntable, drive means adapted to rotate said turntable intermittently and to hold said turntable stationary during a predetermined period of time between the intermittent rotating movements of said turntable, a die-support connected rotatably to said turntable, a first die connected to said die-support to turn in unison therewith, said die-support having terminal receiving bores in which terminals can be located, said die-support also having means adapted to support the lower ends of terminals which are located in said bores, a pressing station to which the turntable transports said die-support, a second die located at the pressing station and mounted independently of said turntable, the second die having openings which receive the terminals when the second die is moved to pressing position, quick-action mechanism movable relative to said drive means and controlled by said drive means and adapted to move the second die into and out of pressing position in a period which is shorter than the aforesaid period.

8. A machine for making the presses of tubes, comprising a turntable, drive means which include a continuously rotating drive shaft and adapted to rotate said turntable intermittently and to hold the turntable stationary during a predetermined period of time between the intermittent rotating movements of said turntable, a die-support connected rotatably to said turntable, a first die connected to said die-support to turn in unison therewith, said die-support having terminal receiving bores in which terminals can be located, said die-support also having means adapted to support the lower ends of terminals which are located in said bores, said first die being shaped to support a blank which has bores through which said terminals project, a pressing station to which the turntable transports the die-support, heating means located anterior the pressing station and adapted to heat the blank, said die-support having associated tube-holding means mounted on said turntable and adapted to hold a tube slidably with the bottom of said tube separated from the top of said blank, a second die located at said pressing station and mounted independently of said turntable, said die having a first opening adapted to receive the upper part of said tube and also having additional openings which are adapted to receive the upper parts of said terminals when the second die is moved into pressing position, first actuating means operated by said shaft and adapted to move the second die from a top position thereof to a position anterior its pressing position, and in which the respective openings of the second die respectively receive the upper parts of said tubes and of said terminals, second actuating means operated by a source of power which is independent of said shaft and controlled by said shaft and adapted to move the second die to its pressing position and upwardly away therefrom while the first die is held stationary at said pressing station, the first actuating means being adapted to move the second die upwardly until it clears the elements on the turntable and while the first die is held stationary at said pressing station.

9. A machine for making the presses of tubes, comprising a carrier, a die-support rotatably connected to the carrier, a die connected to said die-support to turn in unison therewith, said die having terminal-receiving bores in which terminals can be located, means connected to said carrier and adapted to support said terminals with their ends projecting above the tops of the bores, a first gear connected to said die-support and adapted to rotate the die-support, a second gear connected to said carrier and movable into and out of mesh with the first gear, a third gear turnable independently of the carrier and adapted to turn the second gear, said third gear being located so that the second gear is simultaneously meshed with said first gear and with said third gear and said second gear is simultaneously unmeshed from the first gear and the third gear, tube-holding means mounted on said carrier and adapted to hold a tube above the top of the die, said tube-holding means being movable to release the tube, a movable control member for said tube-holding means, said movable control member operating said tube-holding means to release the tube when said movable control member is actuated in a predetermined direction, first control means adapted to actuate said control member independently of the second gear so as to release the tube while the gears remain in mesh.

10. A machine according to claim 9 in which the machine has second control means adapted to unmesh said gears while the tube is thus released.

11. A machine for making the presses of tubes, comprising a turntable, a series of spaced spindle units mounted on said turntable, means adapted to turn said turntable intermittently and to hold it against turning between the intermittent movements thereof, each spindle unit comprising a die-support which is rotatable about a respective predetermined axis which is independent of the axis of rotation of the turntable, each said die-support having a die connected thereto to turn in unison therewith, each die having terminal-receiving bores in which terminals can be located, each spindle unit having means adapted to support the lower ends of said terminals so that the upper ends of said terminals will project above the upper ends of their respective bores, each said spindle unit having tube-supporting means adapted to support a tube above the top of said die, each said die-support comprising a turnable sleeve to which the die is directly connected, each said sleeve has a spindle located therein, each sleeve being connected to its spindle so that each sleeve turns in unison with its spindle and each spindle can be moved upwardly relative to its sleeve, each sleeve having a first gear connected thereto and adapted to rotate the respective sleeve about the respective predetermined axis, each unit having a second gear, a third gear mounted independently of said turntable and adapted to rotate the second gears, the second gears being vertically movable relative to their first gears and relative to the third gear to mesh with the first and third gears and to be unmeshed therefrom, the second gears being connected to respective and vertically movable second sleeves, rods located respectively in the second sleeves and being respectively vertically movable relative to the second sleeves, each rod having means adapted to actuate the respective tube-supporting means to release the respective tube when the rod is actuated vertically relative to its respective second sleeve, first control means adapted to move each rod vertically relative to its second sleeve to cause the release of the respective tube without unmeshing the respective second gear, second control means adapted to actuate each rod vertically and also to actuate the respective second sleeve vertically in order to simultaneously maintain each second gear unmeshed and to maintain its respective tube-holding means inoperative.

12. A machine for making the presses of tubes comprising a turntable, means including a continuously rotated drive shaft and adapted to rotate said turntable intermittently and to hold the turntable stationary between the intermittent turning movements thereof, said turntable having an axial bore, a vertically movable rod located in said bore, a bracket located above said turntable and supported independently of said turntable, a lever pivoted to said bracket and to the upper end of the rod, a cylinder connected to said lever and movable by said lever to an upper position and a lower position, a cam connected to said drive shaft and adapted to raise and to lower said cylinder at predetermined intervals, a piston located in said cylinder and having a depending piston rod, a die connected to said piston rod, a gas-inlet pipe connected to said cylinder, a control-valve for said gas-inlet pipe which is adapted to control the passage of gas through said gas-inlet pipe and the operation of said die by said piston rod, said control-valve having control means actuated by said shaft and adapted to move said piston first down and then up while the cylinder is in its lower position.

13. A machine for making the presses of tubes comprising a turntable, means including a continuously rotated drive shaft and adapted to rotate said turntable intermittently and to hold the turntable stationary between the intermittent turning movements thereof, said turntable having an axial bore, a vertically movable rod located in said bore, a bracket located above said turntable and supported independently of said turntable, a lever pivoted to said bracket and to the upper end of the rod, a cylinder connected to said lever and movable by said lever to an upper position and a lower position, a cam connected to said drive shaft and adapted to raise and to lower said cylinder at predetermined intervals, a piston located in said cylinder and having a depending piston rod, a die connected to said piston rod, a gas-inlet pipe connected to said cylinder, a control-valve which is adapted to control the passage of gas through said gas-inlet pipe and the operation of said die by said piston rod, said control-valve having control means actuated by said shaft and adapted to move said piston first down and then up while the cylinder is in its lower position, said upper die having a central opening in its lower face which is adapted to receive the upper end of a tube, and having additional openings adapted to receive the upper ends of tube terminals.

WALTER GUSTAVE SCHNEIDER.
GERHARD GUNTHER SCHNEIDER.